US012794183B2

(12) United States Patent
Chen

(10) Patent No.: US 12,794,183 B2
(45) Date of Patent: Nov. 10, 2026

(54) ELECTRICAL CONNECTOR

(71) Applicants: FOXCONN (KUNSHAN) COMPUTER CONNECTOR CO., LTD., Kunshan (CN); FOXCONN INTERCONNECT TECHNOLOGY LIMITED, Grand Cayman (KY)

(72) Inventor: Ming-Ching Chen, New Taipei (TW)

(73) Assignees: FOXCONN (KUNSHAN) COMPUTER CONNECTOR CO., LTD., Kunshan (CN); FOXCONN INTERCONNECT TECHNOLOGY LIMITED, Grand Cayman (KY)

(*) Notice: Subject to any disclaimer, the term of this patent is extended or adjusted under 35 U.S.C. 154(b) by 296 days.

(21) Appl. No.: 18/673,906

(22) Filed: May 24, 2024

(65) Prior Publication Data

US 2024/0396269 A1 Nov. 28, 2024

(30) Foreign Application Priority Data

May 25, 2023 (CN) ......................... 202310598209.1

(51) Int. Cl.
*H01R 13/6585* (2011.01)
*H01R 13/02* (2006.01)
*H01R 13/502* (2006.01)
*H01R 13/652* (2006.01)

(52) U.S. Cl.
CPC ......... *H01R 13/6585* (2013.01); *H01R 13/02* (2013.01); *H01R 13/502* (2013.01); *H01R 13/652* (2013.01)

(58) Field of Classification Search
CPC .. H01R 13/6585; H01R 13/02; H01R 13/502; H01R 13/652
USPC .............................. 439/607.05, 74, 247, 248
See application file for complete search history.

(56) References Cited

U.S. PATENT DOCUMENTS

| | | | | |
|---|---|---|---|---|
| 6,250,935 | B1 * | 6/2001 | Mochizuki | H01R 13/658 439/74 |
| 7,278,861 | B2 | 10/2007 | Kishi et al. | |
| 7,354,279 | B2 | 4/2008 | Uesaka | |
| 9,337,585 | B1 | 5/2016 | Yang | |
| 10,135,197 | B2 | 11/2018 | Little et al. | |
| 10,573,985 | B2 | 2/2020 | Hasegawa et al. | |

(Continued)

FOREIGN PATENT DOCUMENTS

| | | |
|---|---|---|
| CN | 2757356 Y | 2/2006 |
| CN | 201440536 U | 4/2010 |

(Continued)

*Primary Examiner* — Gary F Paumen
(74) *Attorney, Agent, or Firm* — Ming Chieh Chang

(57) ABSTRACT

An electrical connector includes: an insulative housing including a pair of side walls and a tongue located between the pair of side walls; a first row of contacts and a second row of contacts secured to the pair of side walls, respectively, each of the two rows of contacts having a fixed portion, a U-shaped mating portion, a connecting portion between the fixed portion and the U-shaped mating portion, and an extension end extending from the U-shaped mating portion; and a ground shield secured to the tongue, the ground shield having a base, a first row of contacting portions in touch with selected ones of the first row of contacts, a second row of contacting portions in touch with selected ones of the second row of contacts, and a terminating end.

8 Claims, 11 Drawing Sheets

(56) References Cited

U.S. PATENT DOCUMENTS

| | | | | |
|---|---|---|---|---|
| 10,897,098 | B2 | 1/2021 | Suda et al. | |
| 2005/0095881 | A1 * | 5/2005 | Fan | H01R 12/716 439/74 |
| 2005/0101163 | A1 * | 5/2005 | Obikane | H01R 13/6471 439/74 |
| 2009/0061655 | A1 * | 3/2009 | Miyazaki | H01R 13/20 439/74 |
| 2018/0183189 | A1 * | 6/2018 | Chuang | H01R 13/6585 |
| 2019/0260147 | A1 | 8/2019 | Pitten et al. | |
| 2020/0266584 | A1 | 8/2020 | Lu | |
| 2024/0030658 | A1 | 1/2024 | Little | |

FOREIGN PATENT DOCUMENTS

| | | | | | |
|---|---|---|---|---|---|
| CN | 206628618 | U | | 11/2017 | |
| CN | 207134552 | U | | 3/2018 | |
| CN | 109586063 | A | * | 4/2019 | H01R 12/73 |
| CN | 112615176 | A | * | 4/2021 | H01R 12/707 |
| CN | 113302802 | A | | 8/2021 | |
| WO | 2018175052 | A1 | | 9/2018 | |

* cited by examiner

ELECTRICAL CONNECTOR

BACKGROUND OF THE INVENTION

1. Field of the Invention

The present invention relates to an electrical connector comprising: an insulative housing including a pair of side walls and a tongue located between the pair of side walls; a first row of contacts and a second row of contacts secured to the pair of side walls, respectively, each of the two rows of contacts having a fixed portion, a U-shaped mating portion, and a connecting portion between the fixed portion and the U-shaped mating portion; and a ground shield to improve electrical characteristics.

2. Description of Related Art

U.S. Pat. No. 10,573,985 discloses an electrical connector assembly comprising: a receptacle connector including an insulative housing and a first and second rows of contacts secured to the insulative housing; and a complementary plug connector including a stationary housing, a separate movable housing, and a first and second rows of contacts secured between the stationary and movable housings. The receptacle connector further includes a respective retained fitting at each of two ends thereof; the plug connector further includes respective retaining fittings which engages the retained fittings. The retaining fittings reinforce the movable housing of the plug connector.

SUMMARY OF THE INVENTION

An electrical connector comprises: an insulative housing including a pair of side walls and a tongue located between the pair of side walls; a first row of contacts and a second row of contacts secured to the pair of side walls, respectively, each of the two rows of contacts having a fixed portion, a U-shaped mating portion, a connecting portion between the fixed portion and the U-shaped mating portion, and an extension end extending from the U-shaped mating portion; and a ground shield secured to the tongue, the ground shield having a base, a first row of contacting portions in touch with selected ones of the first row of contacts, a second row of contacting portions in touch with selected ones of the second row of contacts, and a terminating end.

An electrical connector assembly comprises: a first connector including: an insulative housing including a pair of side walls and a tongue located between the pair of side walls; a first row of contacts and a second row of contacts secured to the pair of side walls, respectively, each of the two rows of contacts having a fixed portion, a U-shaped mating portion, a connecting portion between the fixed portion and the U-shaped mating portion, and an extension end extending from the U-shaped mating portion; and a ground shield secured to the tongue, the ground shield having a base, a first row of contacting portions in touch with selected ones of the first row of contacts, a second row of contacting portions in touch with selected ones of the second row of contacts, and a terminating end; and a complementary second connector including: a stationary housing; a first row of contacts and a second row of contacts secured to the stationary housing; and a movable housing being separate from and movable relative to the stationary housing, the movable housing being secured to one part of the first and second rows of contacts and the stationary housing being secured to another part of the first and second rows of contacts, the one part of the first and second rows of contacts being mateable with the U-shaped mating portions of the two rows of contacts of the first connector.

DETAILED DESCRIPTION OF THE PREFERRED EMBODIMENT

Figure 1:
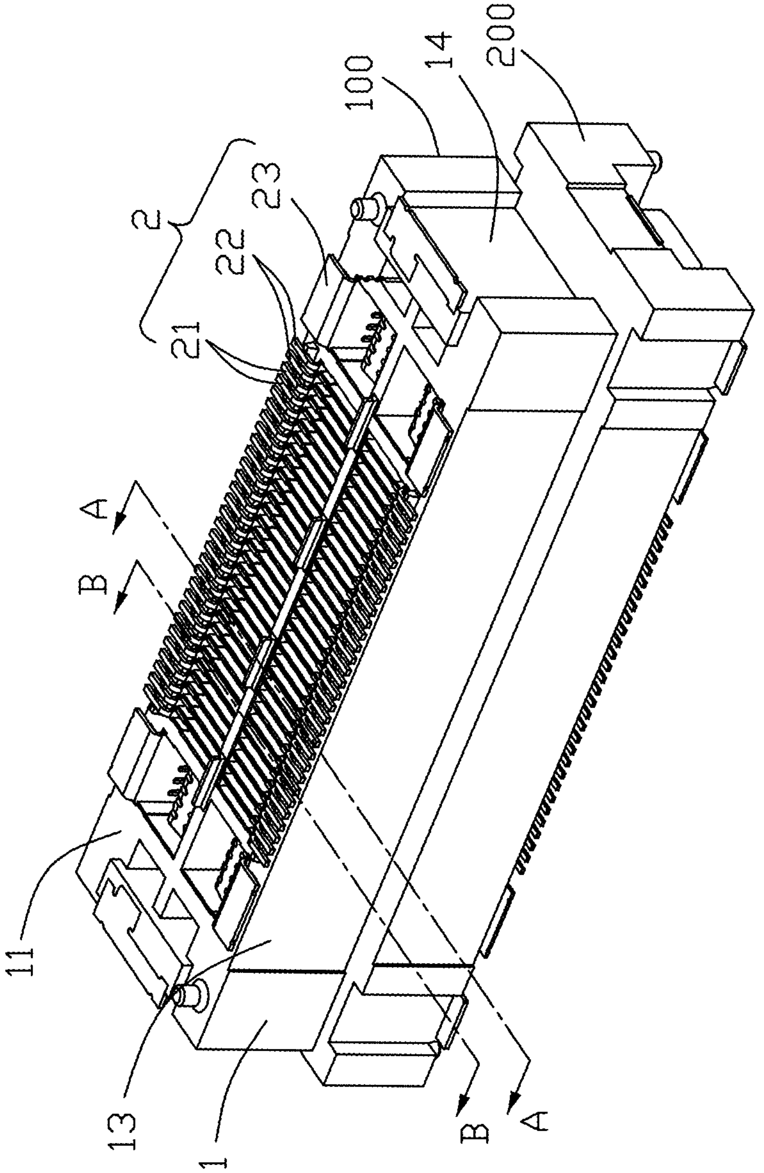
FIG. 1 is a perspective view of an electrical connector assembly in accordance with the present invention.

Referring to FIGS. 1-11, an electrical connector assembly includes a receptacle connector 100 and a complementary plug connector 200. The receptacle connector 100 includes an insulative housing 1 and two rows of contacts 2 secured to the insulative housing 1. Each row of contacts 2 has plural signal contacts 21, ground contacts 22, and power contacts 23. The signal contacts 21 and the ground contacts 22 are alternately arranged; the power contacts 23 are arranged at two outer sides of the signal and ground contacts 21 and 22. The insulative housing 1 has a base 11, a tongue 12, a pair of elongate side walls 13, and a pair of end walls 14, which together define a receiving space 15 for the plug connector 200 to enter. The two rows of contacts 2 are secured to the pair of side walls 13, respectively.

The receptacle connector 100 further has a ground shield 3 secured to the tongue 12 between the side walls 13. The ground shield 3 has a base 34, two rows of contacting portions 31 extending upward from the base 34, and one or more terminating ends 32 extending downward from the base 34. The ground shield 3 further has a pair of mounting portions 33 and corresponding extending portions 35 between the pair of mounting portions 33 and the base 34. The ground shield 3 is unitarily formed of a single piece, preferably stamped and formed from a metal plate. The two rows of contacting portions 31 are in touch with the ground contacts 22 of the two row of contacts 2, respectively.

Figure 2:
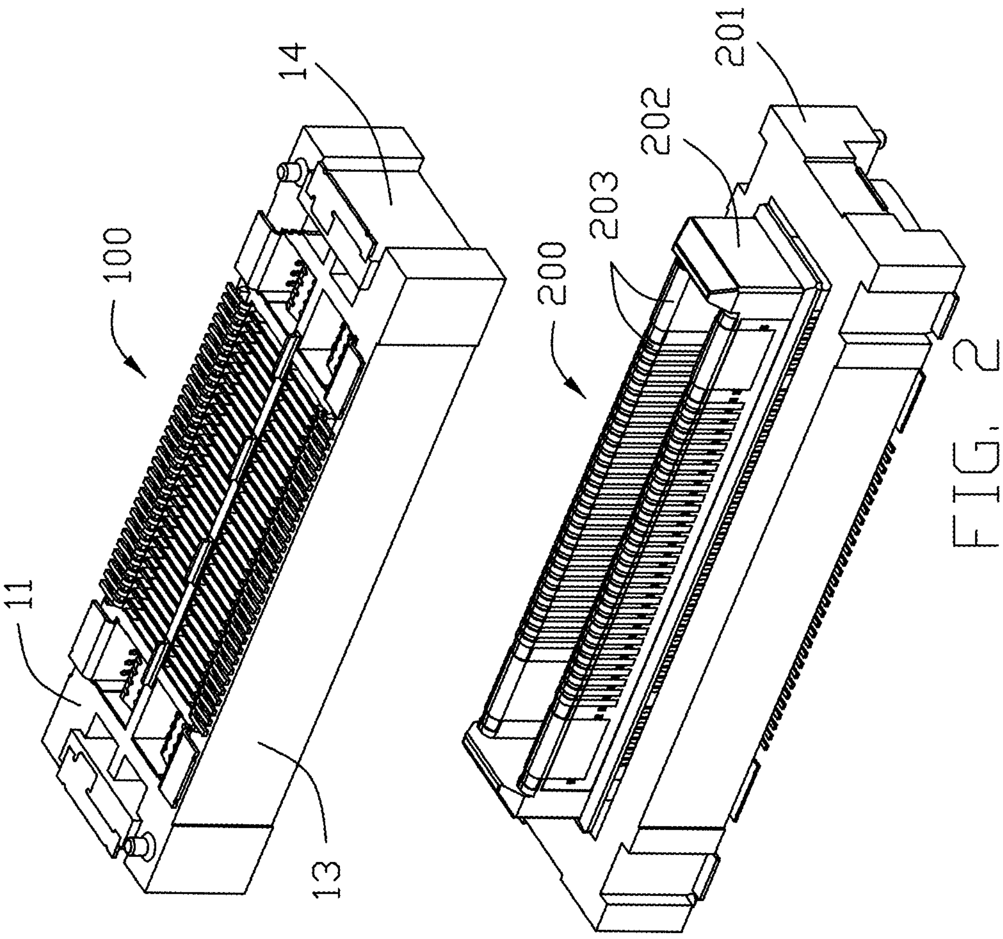
FIG. 2 is a perspective view of a receptacle connector and a plug connector of the electrical connector assembly.
Figure 3:
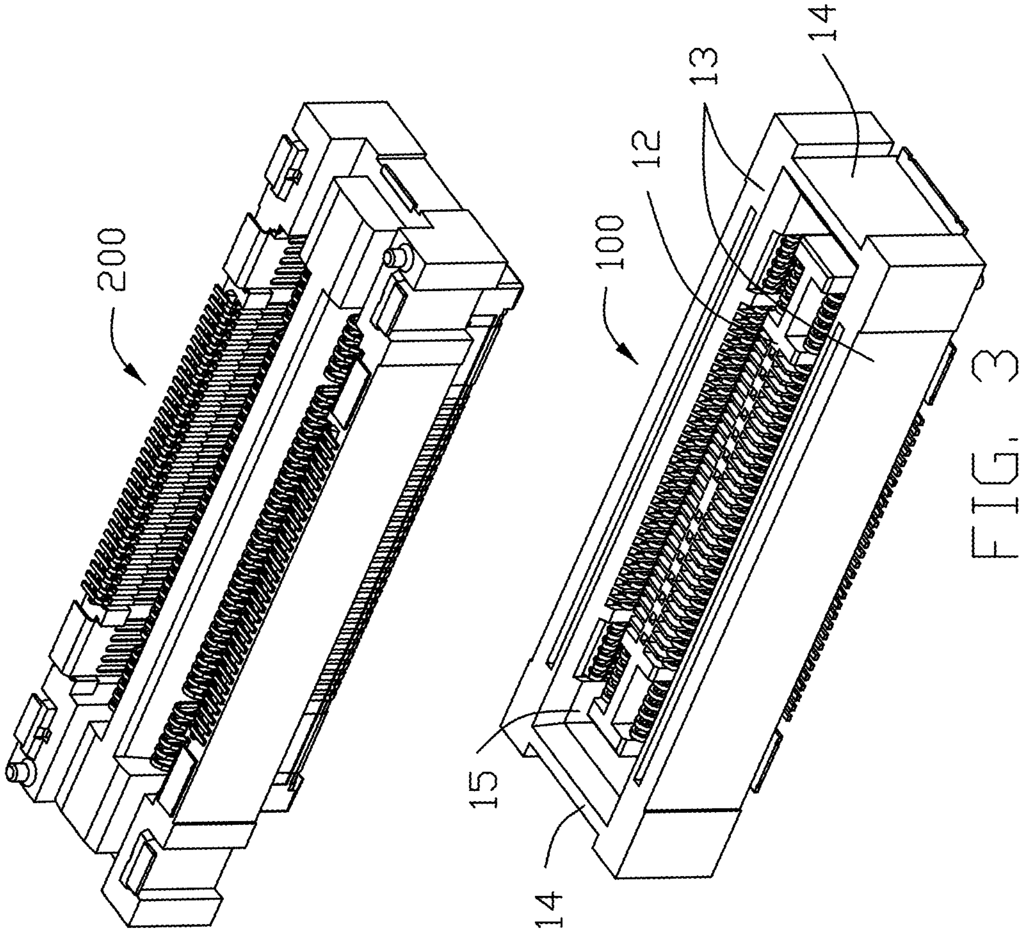
FIG. 3 is another perspective view of the receptacle connector and the plug connector.
Figure 4:
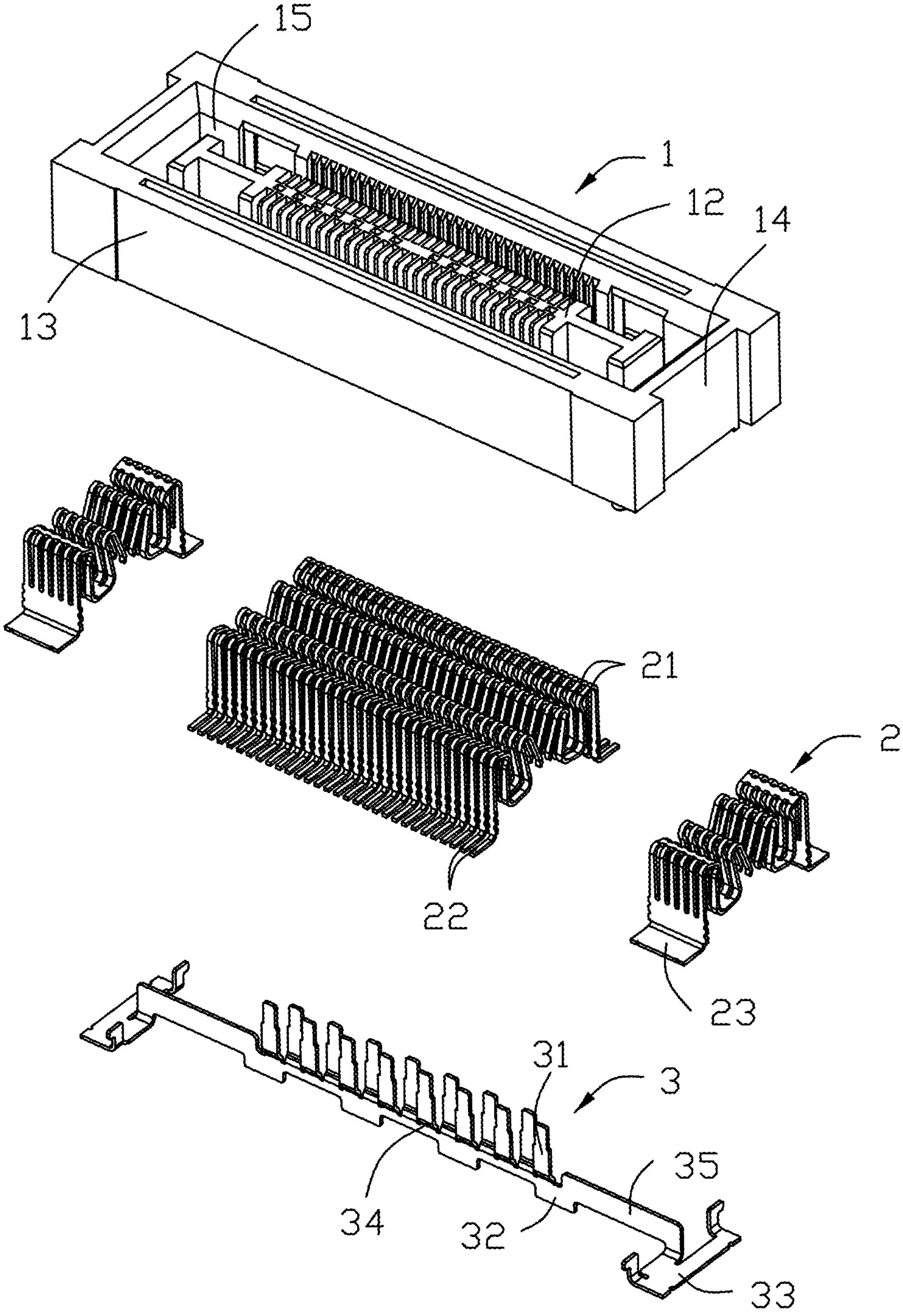
FIG. 4 is an exploded view of the receptacle connector.
Figure 5:
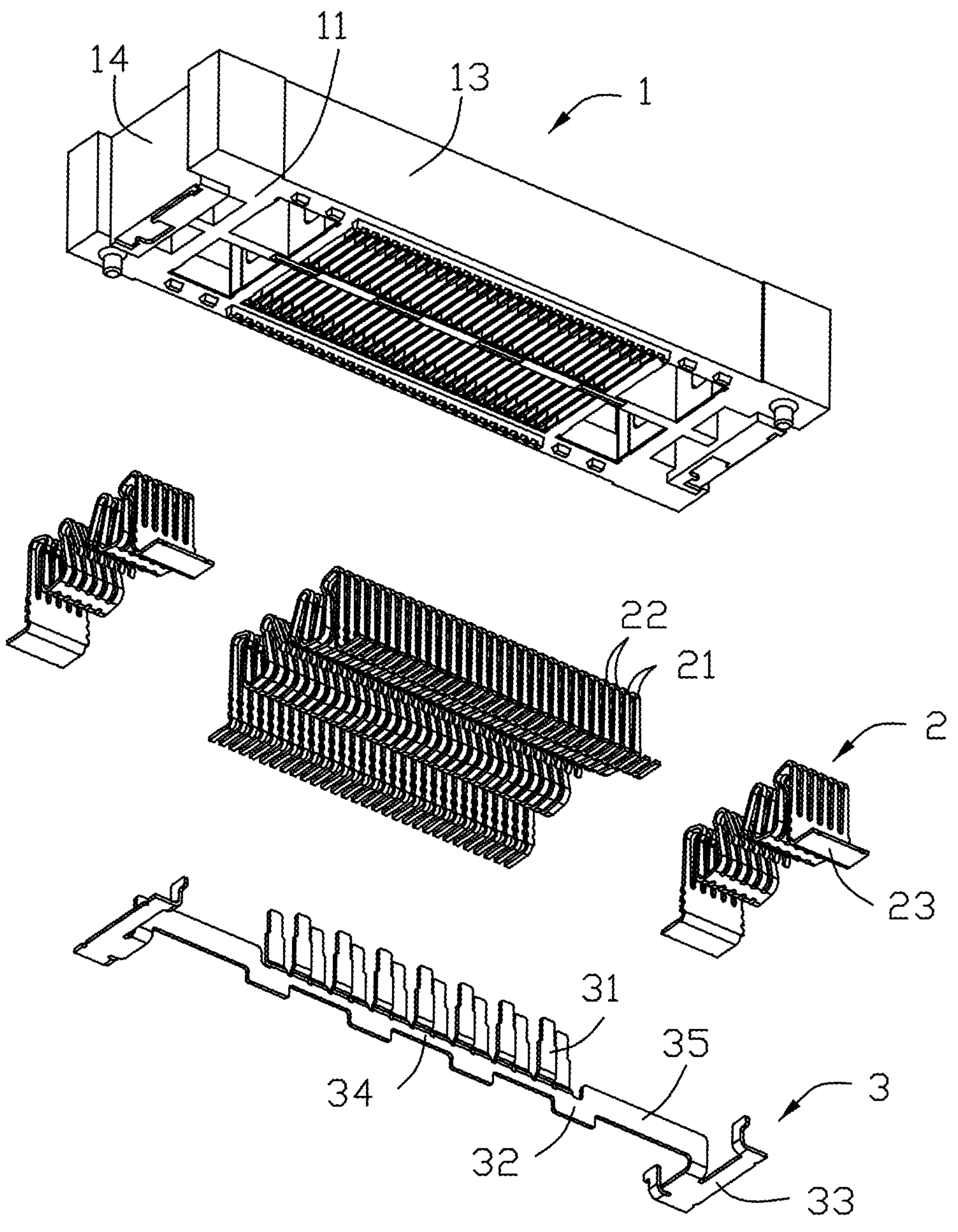
FIG. 5 is another exploded view of the receptacle connector.
Figure 6:
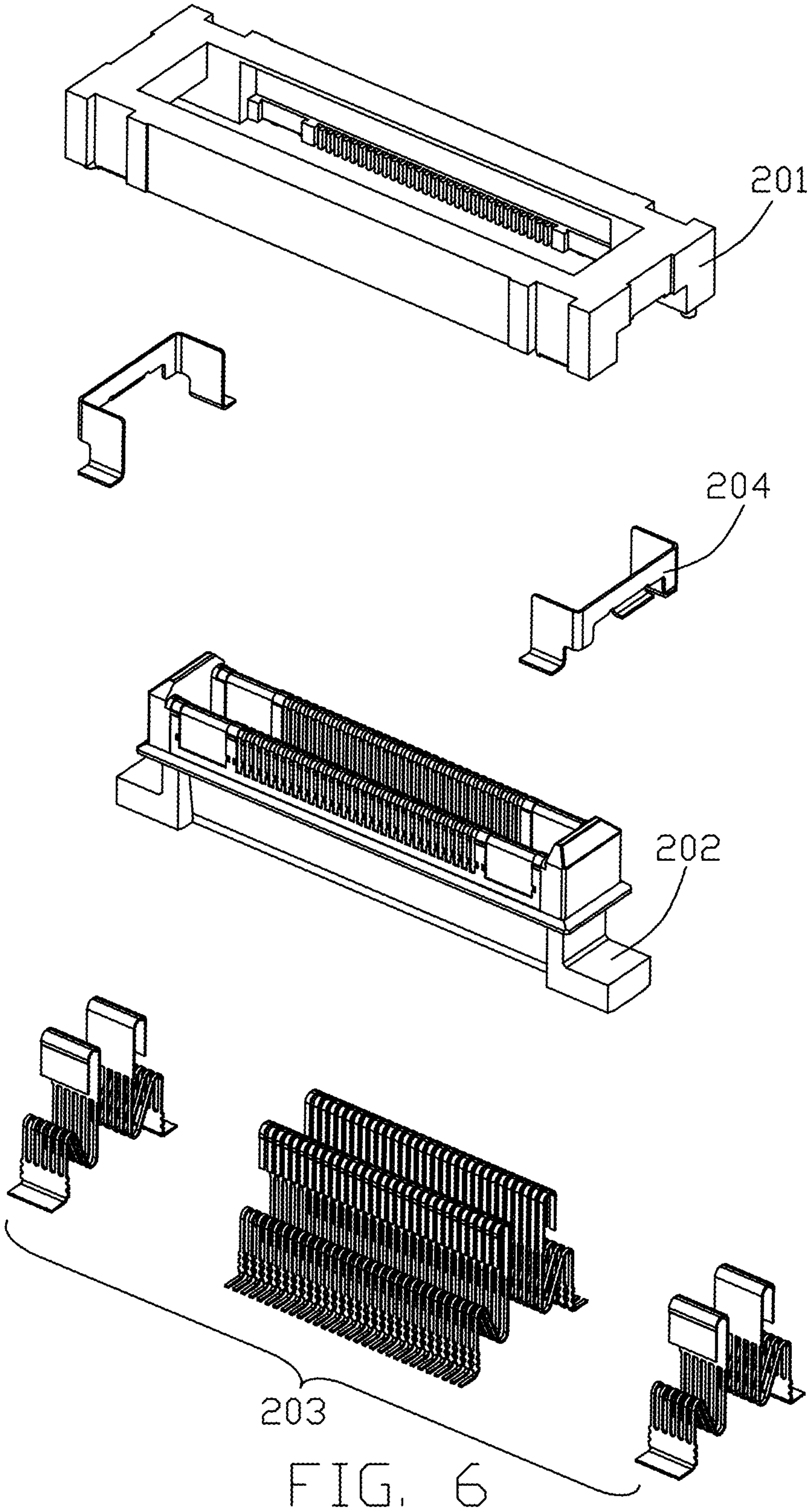
FIG. 6 is an exploded view of the plug connector.

Referring to FIGS. 2 and 6 in particular, the plug connector 200 includes a stationary housing 201, a movable housing 202 separate from the stationary housing 201, and two rows of contacts 203 secured between the stationary housing 201 and the movable housing 202 so that the movable housing 202 is movable relative to the stationary housing 201. The plug connector 200 may further have a pair of retainers 204. When the receptacle connector 100 and the plug connector 200 are mated, each contact 2 is in touch with a corresponding contact 203.

Figure 7:
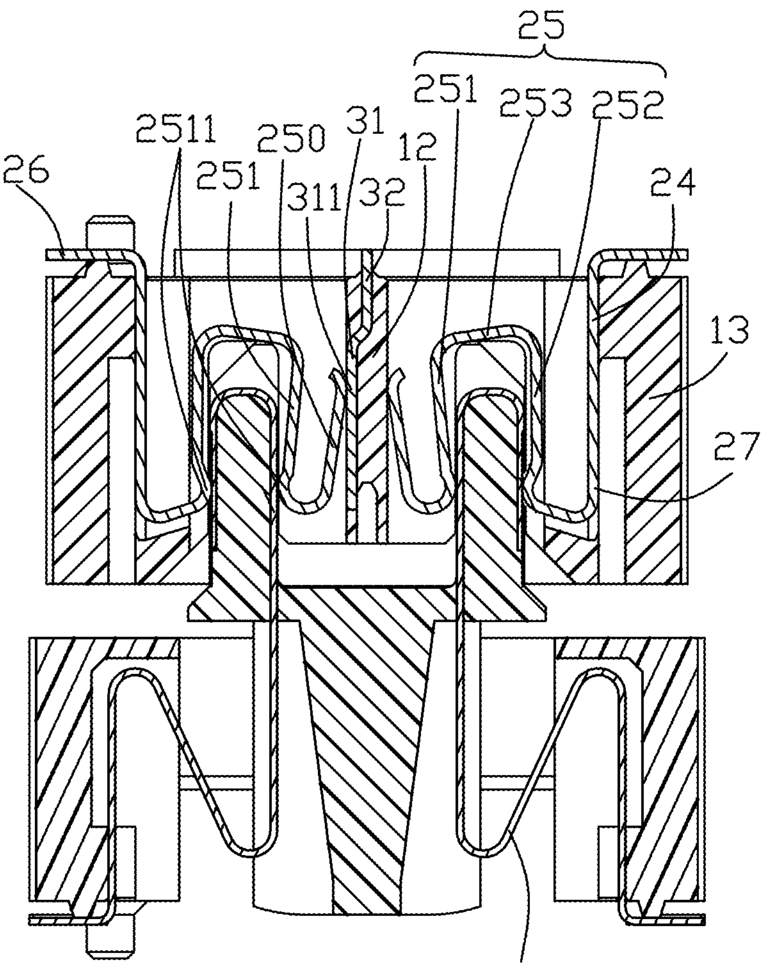
FIG. 7 is a cross-sectional view of the electrical connector assembly taken along line A-A in FIG. 1.
Figure 8:
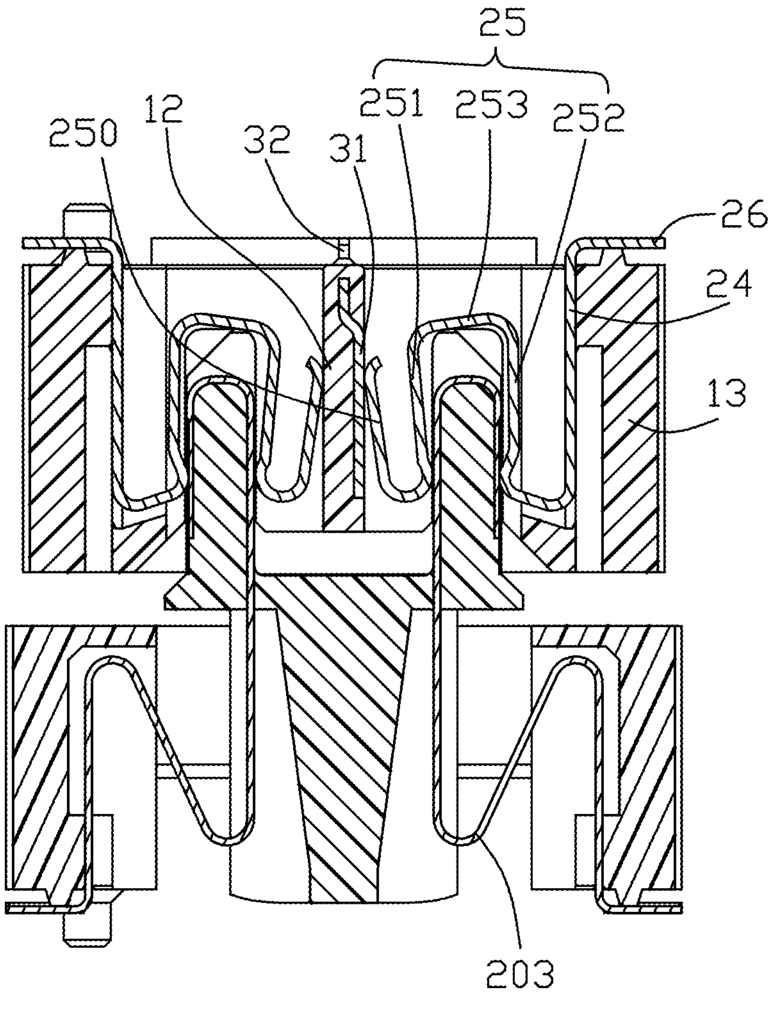
FIG. 8 is a cross-sectional view of the electrical connector assembly taken along line B-B in FIG. 1.

Referring to FIGS. 7 and 8 in particular, the tongue 12 has a pair of opposite side surfaces facing the contacts 2 and exposing the two rows of contacting portions 31. Each contact 2 has a fixed portion 24, a U-shaped mating portion 25, a connecting portion 27 between the fixed portion 24 and the U-shaped mating portion 25, and an extension end 250 extending from the U-shaped mating portion 25. Each contact 2 further has a terminating end 26 and a connecting portion 27 between the terminating end 26 and the U-shaped mating portion 25. The U-shaped mating portion 25 has a first arm 251 in connection with the extension end 250, a second arm 252, and a connecting arm 253. The signal contact 21 and the ground contact 22 are of same structure. Each of the first arm 251 and the second arm 252 is in touch with the contact 203 at a respective mating point 2511. The extension ends 250 of the signal contacts 21 are kept in touch with the tongue 12 while the extension ends 250 of the ground contacts 22 are kept in touch with associated contacting portions 31 of the ground shield 3.

Referring to FIG. 7 in particular, when the receptacle connector 100 and the plug connector 200 are mated, the first arm 251 of the U-shaped mating portion 25 of the ground contact 22 contacts both the contact 203 and the contacting portion 31 of the ground shield 3. At this position, an aligned first arm 251 of the U-shaped mating portion 25 of the signal contact 21 on the other row may contact both the contact 203 and the tongue 12 instead of the contacting portion 31 of the ground shield 3. This is so because one row of the contacting portions 31 and the other row of the contacting portions 31 are staggered.

The terminating end 32 of the ground shield 3 and the terminating end 26 of the ground contact 22 extend outwardly of the insulative housing 1 for connecting to an external printed circuit board. The grounding path through a contacting point 311 of the contacting portion 31 of the ground shield 3 is shorter than that through extension end 250, the U-shaped mating portion 25, and the terminating end 26.

Figure 9:
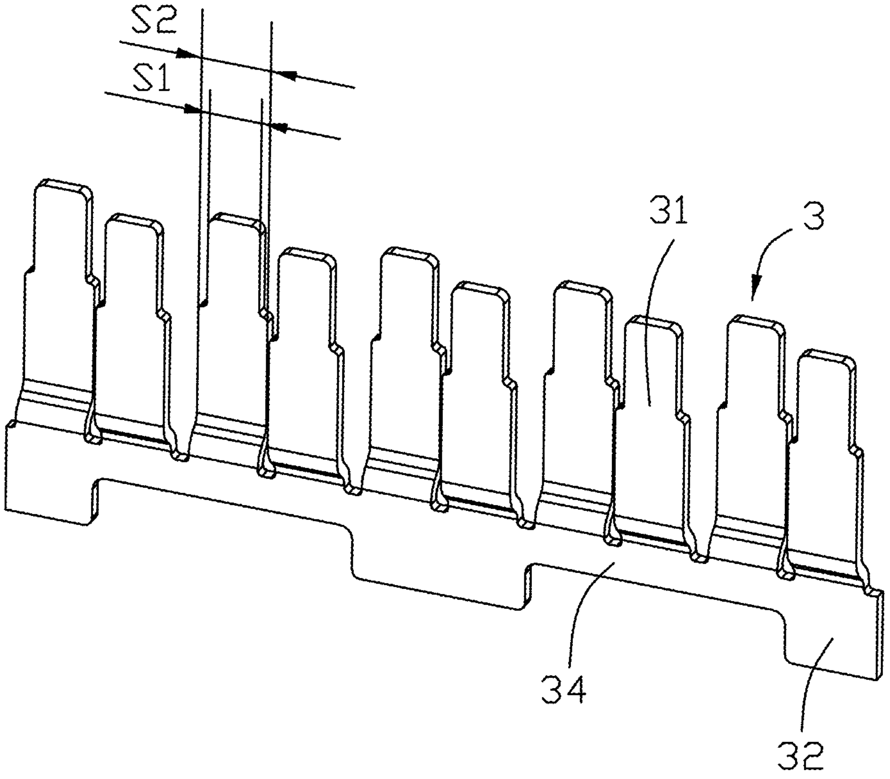
FIG. 9 shows part of a ground shield of the receptacle connector.

Referring to FIG. 9 in particular, the contacting portion 31 of the ground shield 3 includes a lower portion having a width S2 and an upper portion having a width S1 which is less than the width S2 for ease of manufacturing.

Figure 10:
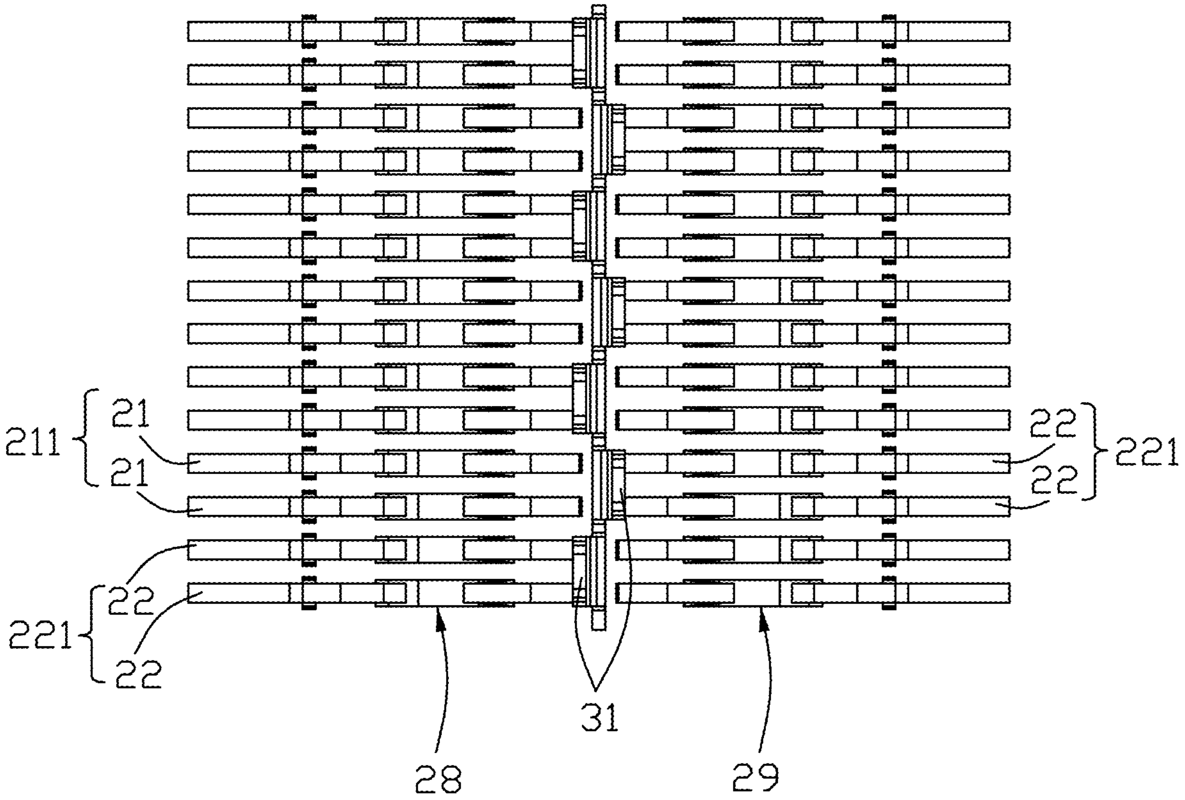
FIG. 10 is a view showing positional relationship between the ground shield and two rows of contacts of the receptacle connector.
Figure 11:
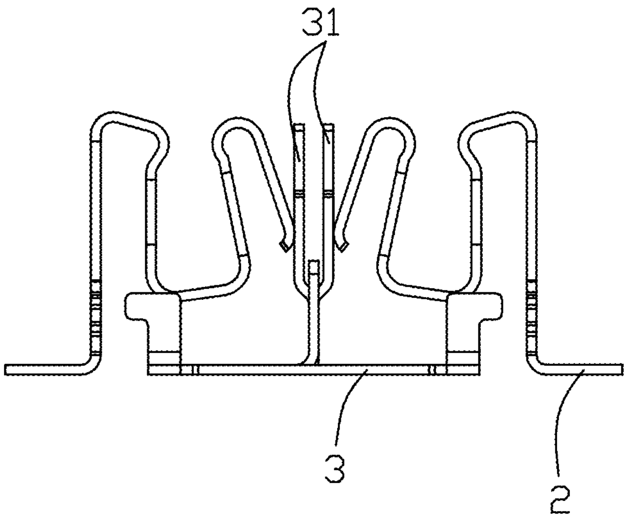
FIG. 11 is another view showing positional relationship between the ground shield and the two rows of contacts.

Referring to FIG. 10 in particular, of the two rows of contacts 2, the ground contacts 22 of a first row of contacts 28 are in touch with the contacting portions 31 of a first row and the ground contacts 22 of a second row of contacts 29 are in touch with the contacting portions 31 of a second row. Each signal contact 21 of the first row of contacts 28 aligns with a corresponding ground contact 22 of the second row of contacts 29. In each row of contacts 28 or 29, the ground contacts 22 are arranged in pairs 221 and the signal contacts 21 are arranged in pairs 211, respectively. Referring to FIG. 11 in particular, an upper edge of the contacting portion 31 is leveled higher than an upper end of the ground contact 22 for better shielding effect.

The invention claimed is:

1. An electrical connector comprising:

an insulative housing including a pair of side walls and a tongue located between the pair of side walls;

a first row of contacts and a second row of contacts secured to the pair of side walls, respectively, each of the two rows of contacts having a fixed portion, a U-shaped mating portion, a connecting portion between the fixed portion and the U-shaped mating portion, and an extension end extending from the U-shaped mating portion; and a ground shield secured to the tongue, the ground shield having a base, a first row of contacting portions in touch with selected ones of the first row of contacts, a second row of contacting portions in touch with selected ones of the second row of contacts, and a terminating end.

2. The electrical connector as claimed in claim 1, wherein the extension ends of the selected ones of the first row of contacts are in touch with the first row of contacting portions of the ground shield and the extension ends of the selected ones of the second row of contacts are in touch with the second row of contacting portions of the ground shield.

3. The electrical connector as claimed in claim 1, wherein the first row of contacting portions and the second row of contacting portions are staggered.

4. The electrical connector as claimed in claim 1, wherein the ground shield is unitarily formed of a single piece.

5. An electrical connector assembly comprising:

a first connector including:

an insulative housing including a pair of side walls and a tongue located between the pair of side walls;

a first row of contacts and a second row of contacts secured to the pair of side walls, respectively, each of the two rows of contacts having a fixed portion, a U-shaped mating portion, a connecting portion between the fixed portion and the U-shaped mating portion, and an extension end extending from the U-shaped mating portion; and a ground shield secured to the tongue, the ground shield having a base, a first row of contacting portions in touch with selected ones of the first row of contacts, a second row of contacting portions in touch with selected ones of the second row of contacts, and a terminating end; and a complementary second connector including:

a stationary housing;

a first row of contacts and a second row of contacts secured to the stationary housing; and a movable housing being separate from and movable relative to the stationary housing, the movable housing being secured to one part of the first and second rows of contacts and the stationary housing being secured to another part of the first and second rows of contacts, the one part of the first and second rows of contacts being mateable with the U-shaped mating portions of the two rows of contacts of the first connector.

6. The electrical connector assembly as claimed in claim 5, wherein the extension ends of the selected ones of the first row of contacts are in touch with the first row of contacting portions of the ground shield and the extension ends of the selected ones of the second row of contacts are in touch with the second row of contacting portions of the ground shield.

7. The electrical connector assembly as claimed in claim 5, wherein the first row of contacting portions and the second row of contacting portions of the ground shield are staggered.

8. The electrical connector assembly as claimed in claim 5, wherein the ground shield is unitarily formed of a single piece.

* * * * *